B. L. PAGE.
WEED PULLING TOOL.
APPLICATION FILED AUG. 7, 1916.

1,262,693.

Patented Apr. 16, 1918.

INVENTOR
Byron L. Page

UNITED STATES PATENT OFFICE.

BYRON L. PAGE, OF SEATTLE, WASHINGTON.

WEED-PULLING TOOL.

1,262,693.  Specification of Letters Patent.  Patented Apr. 16, 1918.

Application filed August 7, 1916. Serial No. 113,629.

*To all whom it may concern:*

Be it known that I, BYRON L. PAGE, a citizen of the United States, residing at Seattle, in the county of King and State of Washington, have invented a new and useful Weed-Pulling Tool, of which the following is a specification.

My invention relates to improvements in weed-pulling tools, used exclusively in extracting weeds from lawns.

Figure 1:
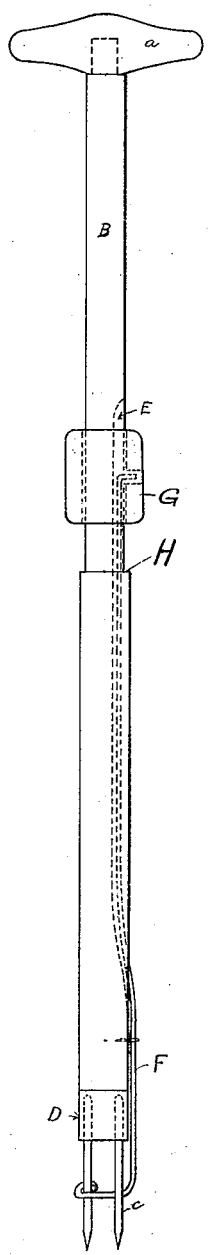
Figure 2:
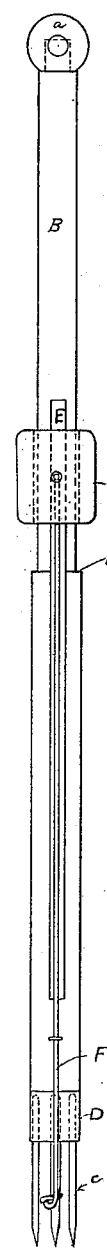
Figure 3:
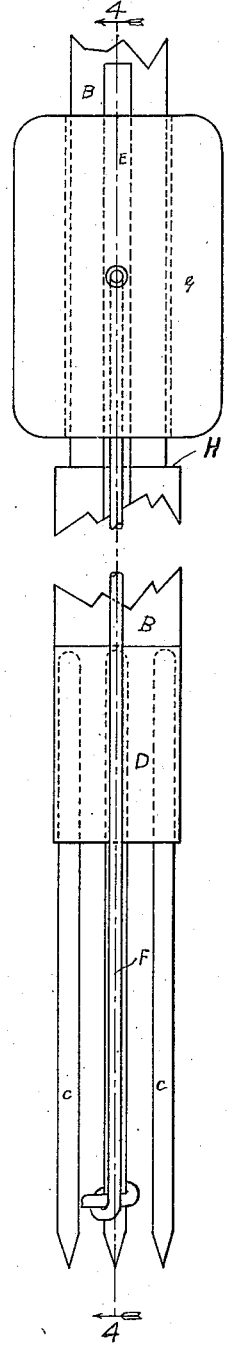
Figure 4:
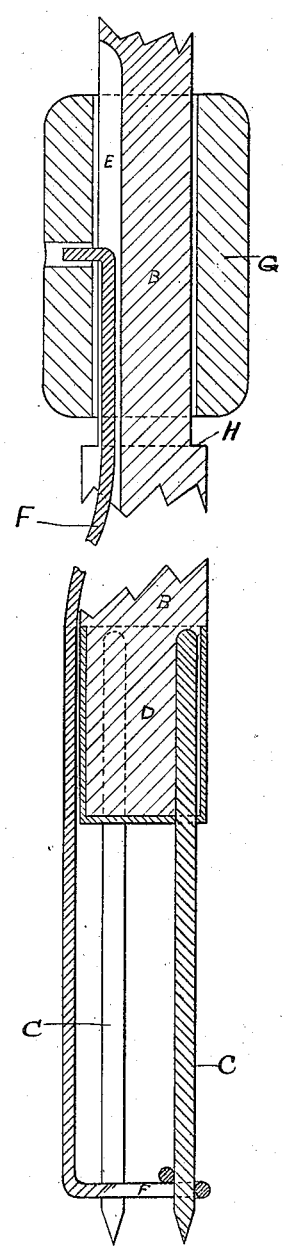

The objects of my invention are first to provide a tool the operator can use in a standing position, second to produce a tool that will get the weeds successfully with the least amount of earth possible. Third to clear the tool of weeds without using the hands direct. I attain these objects by the mechanism illustrated in the accompanying drawing in which Figures 1 and 2 show front and side views respectivtly. Figs. 3 and 4 show that part of the tool carrying the ejector and prongs full size, Fig. 4 being a cross-section of Fig. 3 along line 4, 4. Similar letters refer to similar parts throughout the several views. The wooden grip, *a*, is for the purpose of conveniently handling the tool, and is fastened with mortise and tenon to the upper end of the handle, B, in which three spring steel prongs, *c*, are set. This handle is provided with a reinforcing metal thimble D, which receives the prongs the same being driven through the thimble into the handle. The slot, E, is cut in the handle, for the purpose of housing and guiding the ejector wire, F, from the thimble to the center of the slide, G. The slide receives the ejector wire and is used in operating the ejector. The shoulder stop H formed by the handle being reduced at that point is for the purpose of stopping the slide and ejector.

This tool is so constructed that it can be operated from a standing position. By holding the tool in a vertical position and placing the prongs directly over the crown of the weed and thrusting into the ground, then turning slightly and drawing at the same time a core of earth is cut from the ground, and the root of the weed twisted and loosened, so the core and root are extracted at once with the combined motions. The weed is then ejected by grasping the slide on the handle and giving it a push ahead, which forces the ejector wire down, and clears the weed and earth from the prongs.

Claim:

The combination of a tool body having a slot for an ejector, a reinforcing thimble, a T-grip and a shoulder stop with a weed pulling tool consisting of spring steel prongs and an ejector operating in said slot and connected to a slide adapted to strike said shoulder stop, substantially as described.

BYRON L. PAGE.

Witnesses:
C. B. NICHOLS,
H. W. BAMMERT.

Copies of this patent may be obtained for five cents each, by addressing the "Commissioner of Patents, Washington, D. C."